United States Patent [19]
Anderson et al.

[11] Patent Number: 5,980,375
[45] Date of Patent: Nov. 9, 1999

[54] METHOD AND APPARATUS FOR ANTIMICROBIAL TREATMENT OF ANIMAL CARCASSES

[75] Inventors: Gerald W. Anderson, Shawnee; Michael G. Gangel, Overland Park, both of Kans.

[73] Assignee: Chad Company of Missouri, Inc., Overland Park, Kans.

[21] Appl. No.: 09/059,234

[22] Filed: Apr. 13, 1998

[51] Int. Cl.⁶ .................................................. A22B 5/08
[52] U.S. Cl. ............................................. 452/77; 452/173
[58] Field of Search ................................ 452/71, 74, 77, 452/173

[56] References Cited

U.S. PATENT DOCUMENTS

| | | |
|---|---|---|
| 1,296,914 | 3/1919 | Brosi . |
| 3,135,016 | 6/1964 | Ekstam et al. . |
| 3,178,763 | 4/1965 | Kolman . |
| 3,343,477 | 9/1967 | Ekstam . |
| 3,523,326 | 8/1970 | Ambill . |
| 3,657,768 | 4/1972 | Snowden ................................. 452/77 |
| 4,337,549 | 7/1982 | Anderson et al. . |
| 4,683,618 | 8/1987 | O'Brien ................................ 452/173 |
| 4,868,950 | 9/1989 | Harben, Jr. . |
| 4,965,191 | 10/1990 | Davey .................................... 452/173 |
| 4,965,911 | 10/1990 | Davey . |
| 5,093,140 | 3/1992 | Watanabe ................................ 452/74 |
| 5,326,308 | 7/1994 | Norrie .................................... 452/77 |
| 5,484,332 | 1/1996 | Leech et al. ............................. 452/77 |
| 5,632,676 | 5/1997 | Kurschner et al. ...................... 452/77 |
| 5,651,730 | 7/1997 | McGinnis et al. ....................... 452/74 |

FOREIGN PATENT DOCUMENTS

| | | |
|---|---|---|
| 0181046 | 5/1986 | European Pat. Off. . |
| PCT/CA95/ 00026 | 7/1995 | WIPO . |

OTHER PUBLICATIONS

Evaluation of Hand–Trimming, Various Sanitizing Agents, and Hot Water Spray–Washing as Decontamination Interventions for Beef Brisket Adipose Tissue, Journal of Food Protection, vol. 58, pp. 899–907, Aug. 1995.

Microbial Decontamination of Beef and Sheep Carcasses by Steam, Hot Water Spray Washes, and a Steam–Vacuum Sanitizer, Journal of Food Protection, vol. 59, pp. 127–135.

Comparison of Methods for Contamination Removal from Beef Carcass Surfaces, Journal of Food Protection, vol. 58, No. 4, pp. 368–374, Apr. 1995.

A Preliminary Study to Determine the Efficacy of Spray–Washing on Removal of Bacterial Contamination and Fecal Material from Lamb Carcasses, Final Report, S.L. Kochevar, J.N. Sofos, B.M. Gorman, S.B. LeValley, J.B. Morgan, J.D. Tatum, G.C. Smith and W.E. Cunningham, Center for Red Meat Safety, Department of Animal Sciences, Colorado State University.

*Primary Examiner*—Willis Little
*Attorney, Agent, or Firm*—Shook, Hardy & Bacon LLP

[57] ABSTRACT

A two step antimicrobial treatment of animal carcasses prior to chill storage in a commercial slaughter operation. As a first step, the carcass is isolated in a hot water pasteurization chamber and sprayed with recirculation water at a minimum temperature of at least 165° F. (74° C.) over its entire surface for a minimum time sufficient to kill bacteria. Isolation is achieved with air curtains across the entrance and exit openings, an exhaust system and a liquid level control in the bottom of the chamber. Recirculation water collected in the bottom of the chamber is filtered, combined with makeup water, heated and recirculated to the chamber. As a second step, the carcass is isolated in an acid application chamber and sprayed with an organic acid solution immediately prior to delivery to the chill storage.

21 Claims, 6 Drawing Sheets

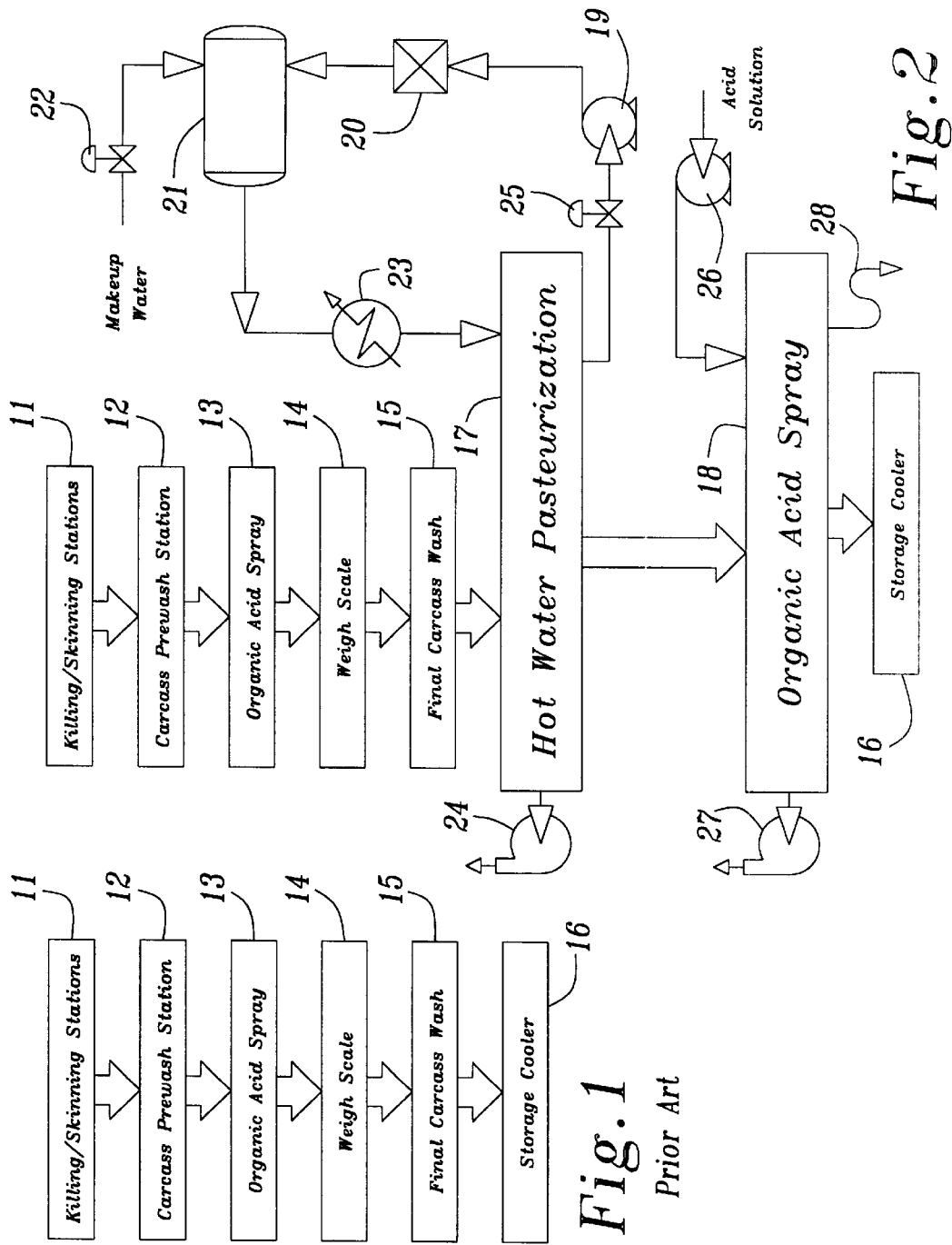

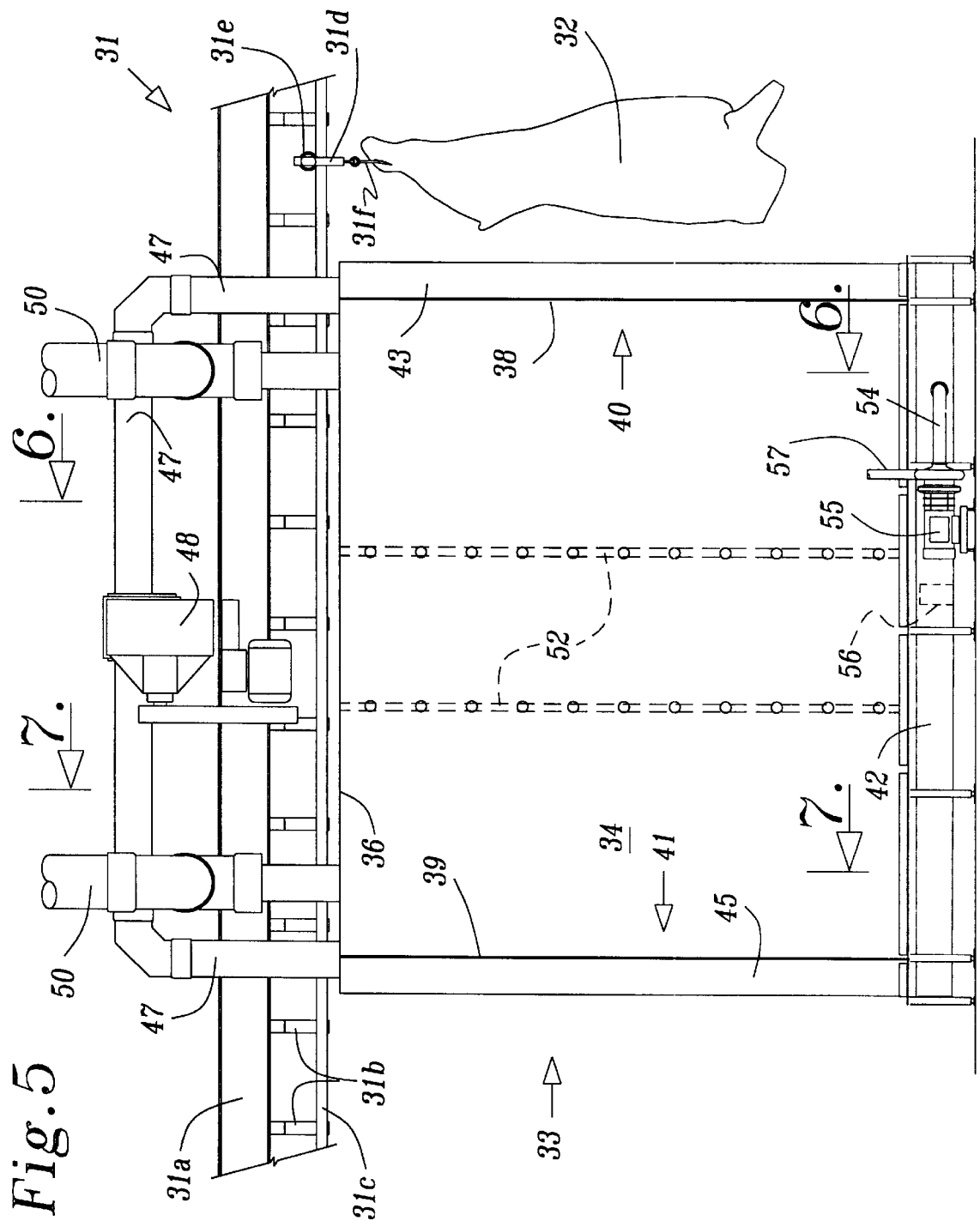

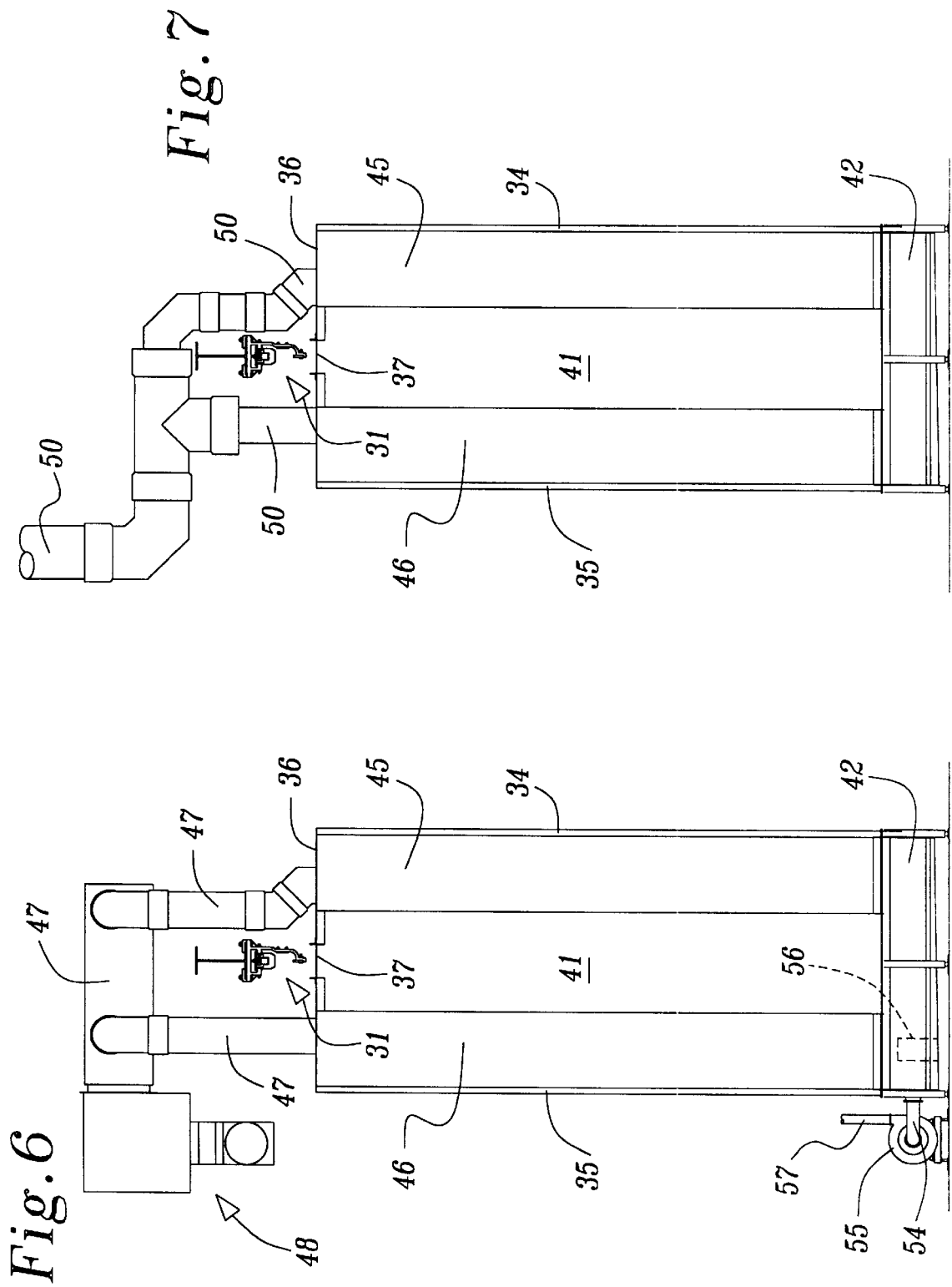

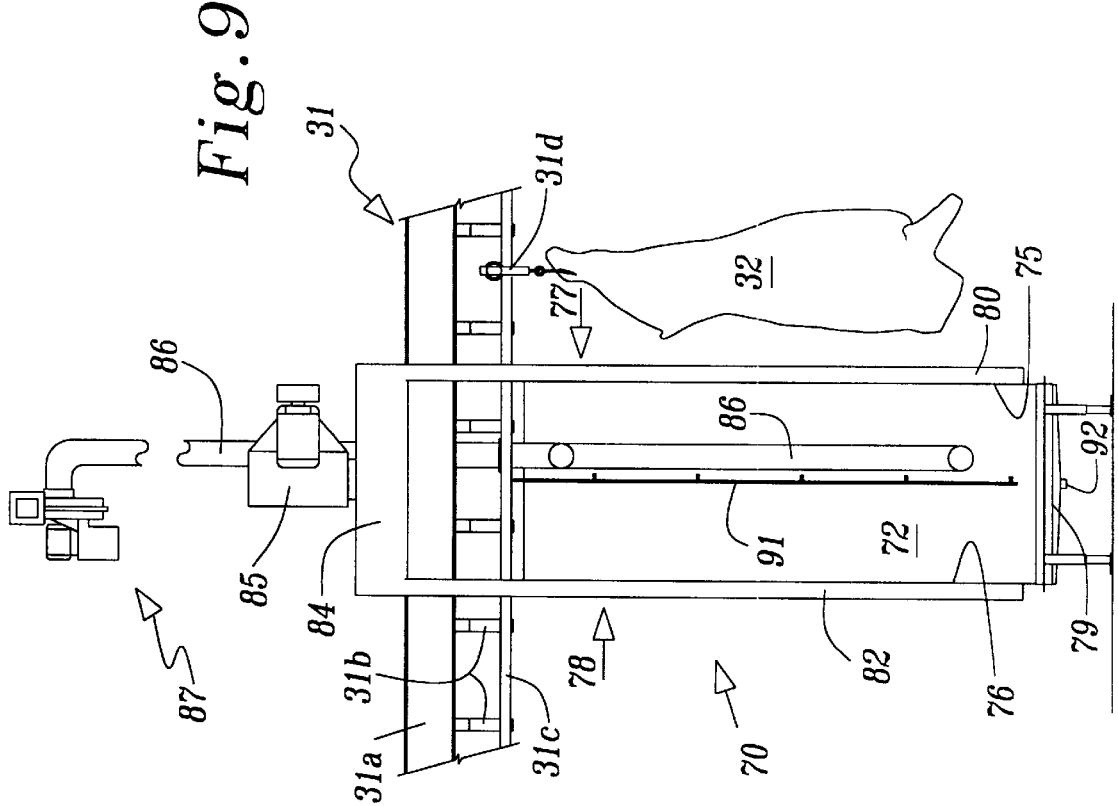
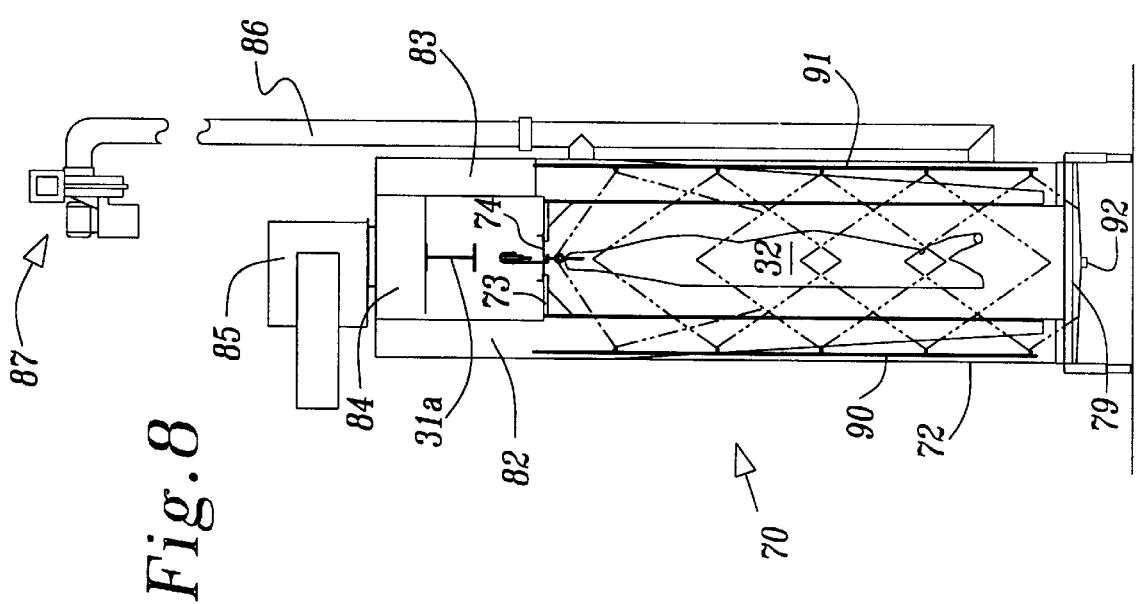

METHOD AND APPARATUS FOR ANTIMICROBIAL TREATMENT OF ANIMAL CARCASSES

This invention relates to an antimicrobial treatment of animal carcasses and, more particularly, to a two step antimicrobial treatment with recycled hot water pasteurization followed by organic acid application performed on an animal carcass subsequent to the final carcass wash and prior to chill storage in a commercial slaughter operation.

BACKGROUND OF THE INVENTION

During the processing of animal carcasses in a commercial slaughter facility, certain bacterial contaminants are introduced or are otherwise associated with the carcasses that subsequently impact the safety and storage life of meat products. During the dressing and fabrication of animal carcasses, bacteria are transferred by the hands of workers and by processing equipment from the animal skin to the carcass. Opportunistic pathogenic and spoilage bacteria, which survive the processing, thrive and multiply in the post-processing environment, thus causing health concerns and reducing the storage life of the end products. There are health and commercial benefits which result from decreased populations of pathogenic and spoilage bacteria on meat including increased safety; increased storage life; improved resistance to the subsequent effects of variable storage and shipping conditions; and compliance with strict foreign importing requirements.

The transfer of bacteria from the skins of animals to meat is a major hygienic problem in processing all animal carcasses including poultry, hogs, sheep and cattle. This problem has been dealt with for many decades in commercial slaughter facilities. The initial approaches to reducing bacteria on the surface of the carcass centered on improving handling and dressing procedures on the slaughter floor and overall sanitation procedures in the entire facility. These efforts have been only partially effective. Since bacterial contamination cannot be wholly avoided, improved equipment and techniques for removing or destroying the bacteria on skinned and eviscerated carcasses are needed.

Several process technologies have been developed and applied in the recent past to reduce bacteria on the surface of the carcass in meat and poultry slaughter operations. The most common antimicrobial treatments currently in use on the slaughter floor include varying stages of water wash, acid wash and steam or hot water pasteurization.

In general, destruction or inactivation of bacteria may be accomplished by the process of pasteurization. Pasteurization, as the term is applied in the food industry, is a process by which a very high percentage of food borne population of microorganisms is killed or rendered incapable of reproduction by raising the internal temperature of the microorganisms to a lethal or critically damaging level in a controlled way (usually by holding the temperature of the microorganisms at a fixed temperature for a fixed time). In contrast to food sterilization processes, more care is given in pasteurization to the inherent sensitivity of the food product to heat exposure to provide an optimum balance between the level of microbial destruction and thermal alteration of the food product. A low-temperature, long-time pasteurization process can achieve the same level of microbial destruction as a high-temperature, short-time process, but the effect on the food product will be vastly different. Negative alteration of the carcass meat (cooking) is minimized by selecting short exposure times at higher temperatures.

The prior art discloses several systems for washing, scalding or decontaminating carcasses prior to refrigeration. Proposals for decontamination include spraying dressed carcasses with solutions of chlorine or organic acids; heating carcass surfaces to pasteurizing temperatures with infrared heaters; and water sprays or sheets of water. Simple cleaning of carcasses with water using an oscillating system of sprayers is proposed by Anderson in U.S. Pat. No. 4,377,549. A hot spray scalding apparatus for fowl carcasses is proposed by Harben in U.S. Pat. No. 4,868,950. Most of the prior art proposals process animal carcasses that are moving on the overhead dressing rail.

In U.S. Pat. No. 4,965,911 to Davey and in U.S. Pat. No. 3,523,326 to Ambill, systems are disclosed in which heated water is directed onto carcasses. These references use differing approaches for delivering heated water to the upper, lateral and convoluted areas of carcasses. These areas are often time shielded from the direct line-of-sight trajectory of the water issuing from the distributing means.

The Davey apparatus is designed for treating dressed beef sides. A plurality of longitudinally aligned vertical sheets of heated water (83.5° C.) are introduced from an overflow weir-type distributing means above the carcass. In order to adapt to convoluted surfaces on the lateral surfaces of a carcass, Davey requires a plurality of baffles positioned at various elevations on either side of the carcass. The baffles impinge the vertically descending sheets of water and deflect them laterally to somewhat better contact the carcass's lateral surfaces. Changes in the size and geometry of the carcass requires manual repositioning of the baffles. Furthermore, the use of deflecting baffles has the tendency of breaking up the descending sheets of water and rapidly cooling the water before contacting the surface of the carcass.

In Ambill's apparatus, carcasses are scaled prior to dehairing, using heated water (about 60° C.) introduced from distributing means located on either side of the carcass. The water is deflected laterally under very low pressure to contact the lateral areas of the carcass. The point of discharge of the distributing means is close to the carcass and vertically movable to oscillate between upper and lower positions, thereby accessing the vertical extent of the carcass. A mechanically complex framework is required to enable the vertical movement of the Ambill's water distributing means. Also, the oscillating, vertical movement of the water distributing means provides only intermittent wetting of portions of the carcass surface. The oscillating vertical movement also contributes to the spray-like pattern of the water trajectory.

The foregoing prior art techniques for reducing the bacteria counts on the surface of the carcass during the slaughter operation suffer various drawbacks. Some techniques have not proven effective in the long term elimination of bacteria on the carcass. This is, quite naturally, the major problem that the commercial slaughter industry faces.

Steam and hot water pasteurization, although both are partially effective in eliminating bacteria, add significant expense to the operation. Steam pasteurization has high equipment and operating costs. Hot water pasteurization, while having reduced equipment costs compared to steam, has very high operating costs as a result of the large volume of water necessary in practicing this technique.

SUMMARY OF THE INVENTION

Accordingly, the need remains in the commercial slaughter industry for an effective and economical antimicrobial treatment of animal carcasses prior to chill storage. The primary goal of this invention is to fulfill such need.

More specifically, an object of the invention is to provide a two step antimicrobial treatment of hot water pasteurization followed by organic acid application performed on an animal carcass subsequent to the final carcass wash and prior to chill storage in a commercial slaughter operation to significantly reduce total bacteria counts and virtually eliminate pathogenic bacteria.

Another object of the invention is to provide a two step antimicrobial treatment of hot water pasteurization followed by organic acid application performed on an animal carcass subsequent to the final carcass wash and prior to chill storage in a commercial slaughter operation wherein the hot water for pasteurization is recycled in the process for operational cost savings without reduced effectiveness in the control of bacteria counts.

Another object of the invention is to provide an antimicrobial treatment of the character described which treats the complete carcass, as opposed to various other techniques which provide only "spot" treatment for a specific area of the carcass or for a visibly identifiable carcass defect.

An additional object of the invention is to provide the equipment and arrangement thereof necessary for carrying out the improved antimicrobial treatment process hereinabove set forth.

Another object of the invention is to provide reliable equipment for an antimicrobial treatment of the character described which is has few moving parts and minimal maintenance requirements.

Another object of the invention is to provide equipment for an antimicrobial treatment of the character described which requires only minimal space on the slaughter floor versus steam pasteurization and other commercial hot water systems.

A further object of the invention is to provide equipment for an antimicrobial treatment of the character described which is low in initial equipment costs versus other antimicrobial systems.

Yet another object of the invention is to provide equipment for an antimicrobial treatment of the character described which has significantly lower operating costs when compared to other antimicrobial systems that are commercially available.

Accordingly, it is an object of the invention to provide a two step antimicrobial treatment of animal carcasses prior to chill storage in a commercial slaughter operation. As a first step, the carcass is isolated in a hot water pasteurization chamber and sprayed with recirculation water at a minimum temperature of at least 165° F. (74° C.) over its entire surface. Isolation is achieved with air curtains across the entrance and exit openings, an exhaust system and a liquid level control in the bottom of the chamber. Recirculation water collected in the bottom of the chamber is filtered, combined with makeup water, heated and recirculated to the chamber. As a second step, the carcass is isolated in an acid application chamber and sprayed with an organic acid solution immediately prior to delivery to the chill storage unit.

Other and further objects of the invention, together with the features of novelty appurtenant thereto, will appear in the course of the following description.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a schematic flow diagram illustrating a typical prior art processing technique used in a commercial slaughter facility;

FIG. 2 is a schematic flow diagram illustrating a preferred embodiment of an antimicrobial treatment of animal carcasses which is the subject matter of this invention;

FIG. 5 is a side elevational view, partly sectional, of the hot water pasteurization cabinet to better illustrate the details of the gambrel rail support assembly, the air door curtains, and the exhaust system;

FIG. 6 is an end elevational view, partly sectional, of the hot water pasteurization cabinet, taken generally along line 6—6 of FIG. 5 in the direction of the arrows, with the exhaust system omitted to better illustrate the details of the components of the air door curtains;

FIG. 7 is an end elevational view, partly sectional, of the hot water pasteurization cabinet, taken generally along line 7—7 of FIG. 5 in the direction of the arrows, with the air door curtain system omitted to better illustrate the details of the components of the exhaust system;

FIG. 8 is an end elevational view of the acid application cabinet to better illustrate the details of the gambrel rail support assembly and the air door curtains used in both the hot water pasteurization and acid application cabinets; and FIG. 9 is a side elevational view, partly sectional, of the acid application cabinet.

DETAILED DESCRIPTION OF THE DRAWINGS

Figure 3:
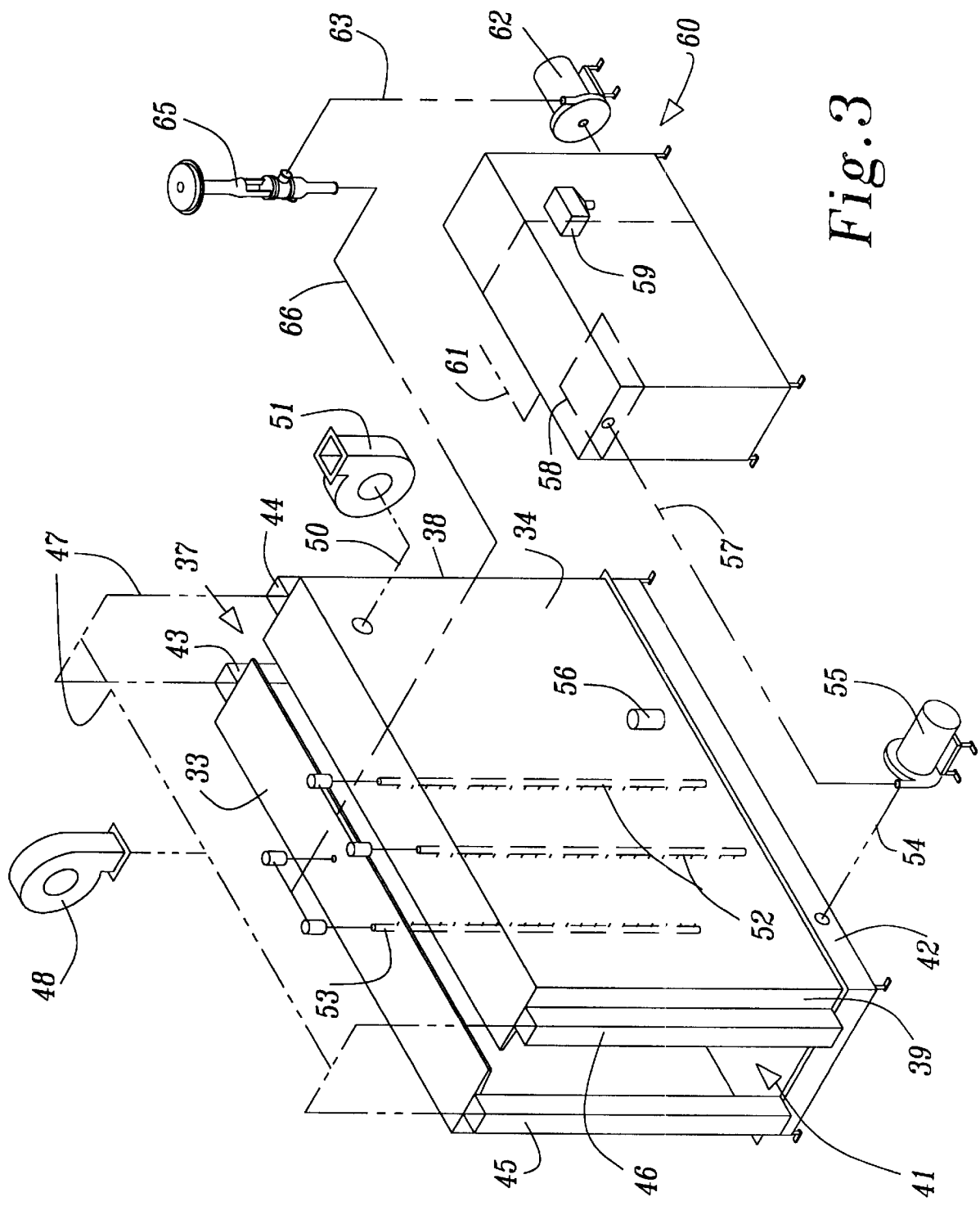
FIG. 3 is a diagram illustrating the equipment arrangement and flow schematic for a hot water pasteurization cabinet used to practice the invention.

Referring to the drawings in greater detail, FIG. 1 shows a schematic flow diagram of representative steps or stages currently being used in a typical slaughter facility. Initially the animal is killed, skinned and washed as block 11 of FIG. 1 is intended to represent. Subsequently, the carcass is suspended from a gambrel held by a wheeled support that is moveable on a rail system for conveyance of the carcass throughout the rest of the processing stages and eventually into the chill storage unit.

Once suspended on a gambrel rail support assembly, the carcass is typically blown with compressed air to remove any loose hair, debris and foreign contaminants, and conveyed to a carcass prewash as block 12 of FIG. 1 is intended to represent. During the carcass prewash step, the carcass is normally washed with low pressure water in a typical temperature range of 95° F. to 105° F. (35° C. to 41° C.). The purpose of the prewash is to remove any remaining hair, debris and foreign contaminants not previously removed by the compressed air, knife trimming or other means.

From the prewash station 12, the carcass is moved on the gambrel rail support assembly to an organic acid spray station as block 13 of FIG. 1 is intended to represent. Here the carcass is subjected to a liquid spray of dilute organic acid solution, such as acetic acid, lactic acid, citric acid, acidified sodium chloride or mixtures thereof, for the purpose of inhibiting bacterial growth and contamination prior to opening the carcass itself.

After the organic acid spray 13, the carcass is transported on the gambrel rail support assembly through subsequent processing steps such as evisceration, splitting the whole carcass into carcass sides, inspection, knife trimming and weighing as block 14 of FIG. 1 is intended to represent.

From the foregoing processing and weigh scale 14, the carcass is moved on the gambrel rail support assembly to a final carcass wash represented by block 15 in FIG. 1. The final carcass wash 15 subjects the carcass to the washing and sanitation standards as established by the United States Department of Agriculture. After the final carcass wash 15, the carcass is delivered to the chill room storage unit where the carcass is cooled and aged as represented by block 16. After aging, typically from 24 to 48 hours, the carcass will then be further processed by meat cutters and packaged for consumption.

In the present invention, it is contemplated to modify the conventional process currently used in a typical slaughter facility, of which the foregoing steps as previously described and as illustrated in FIG. 1 are representative, by adding a two step antimicrobial treatment between the final carcass wash 15 and the storage cooler 16. Reference is now made, therefore, to FIG. 2 which shows a schematic flow diagram illustrating a preferred embodiment of the antimicrobial treatment of animal carcasses which is the subject matter of this invention. It will be understood that the flow diagram blocks 11 through 16 are intended to represent conventional processing stages or techniques as previously described.

Accordingly, the two step antimicrobial treatment is introduced just before the carcass is delivered to chill storage 16. The antimicrobial treatment comprises a hot water pasteurization step represented by block 17 in FIG. 2 followed by an organic acid spray step represented by block 18.

The hot water pasteurization step 17 is generally characterized by conveying a carcass to a hot water pasteurization chamber where the carcass is substantially isolated in a control environment. The entire surface of the carcass is then subjected to recirculation water either sprayed, preferably through oscillating nozzles, or otherwise applied to reach the carcass surface at a minimum temperature of at least 165° F. (74° C.) for a minimum residence time sufficient to kill bacteria. Test results indicate that the hot water should be applied at the minimum temperature over the surface of the carcass for at least five seconds in order to achieve the desired treatment.

Recirculation water applied to the carcass and drained therefrom is collected within the pasteurization chamber and then delivered, such as with pump 19, to a filtering step 20 to remove any entrained particulate matter from the collected water. The filtered water is combined in a storage vessel 21 with fresh makeup water through a control valve 22 in sufficient quantity to provide the volume of recirculation water necessary for delivery to the pasteurization chamber. Heating of the recirculation water is required, such as with heat exchanger 23, to a temperature sufficient to permit the recirculation water to be applied to the carcass at a minimum temperature of at least 165° F. (74° C.) in said spraying step.

It is critical to the success of the process that a minimum of 165° F. (74° C.) water is maintained to the entire surface of the carcass. With a spray system, we have used as a "rule of thumb" standard that the recirculation water should be maintained at a temperature such that water can be sprayed to the centerline of the hot water pasteurization chamber at a temperature of 165° F. (74° C.). Therefore, an incoming water temperature of 180° F. (82° C.) to 195° F. (91° C.) is expected to be required depending on plant elevation, piping losses, and the like.

It is also important to the success of the process that the water in the recirculating system remains at a relatively high temperature. Such a standard will insure the effectiveness of the overall system by maintaining an acceptable microbiological water quality.

Application rates may vary depending on the species and size of carcass. Typical application rates may fall in the range of 150 to 350 gallons per minute (gpm).

Isolation of the carcass within the hot water pasteurization chamber may be accomplished mechanically, but is preferably achieved by a combination of features selected for improved sanitation. Such features include air curtains across the entrance and exit openings of the hot water pasteurization chamber and by an exhaust system 24 to evacuate water vapor from the chamber interior. Moreover, isolation is achieved by maintaining a level of recirculation water within the bottom of the pasteurization chamber, such as with a liquid level controller 25.

The organic acid spray step 18 is generally characterized by conveying the carcass from the hot water pasteurization chamber to an acid application chamber where the carcass is substantially isolated in a control environment. The entire surface of the carcass is then subjected to an acid application, such as with a pressure pump 26 and spray system.

The organic acid employed in the process, as well as concentration, spray temperature and application amounts, may vary. Generally lactic or acetic acid are appropriate choices in concentration ranges of 1.5% to 2.5% by volume. The acid solution can be mixed with water in a temperature range of 110° F. (43° C.) to 130° F. (54° C.) and then applied in a low volume, low pressure spray to thoroughly saturate the carcass. Application rates may vary depending on the species and size of carcass. Typical application rates may fall in the range of 1.0 to 2.0 gallons per minute (gpm).

Isolation of the carcass within the acid application chamber may be accomplished mechanically, but is preferably achieved by a combination of features selected for improved sanitation. Such features include air curtains across the entrance and exit openings of the acid application chamber and by an exhaust system 27 to evacuate water and acid vapors from the chamber interior. Moreover, isolation is achieved by providing a liquid seal drain 28 in the bottom of the acid application chamber.

The carcass is lastly delivered to the storage cooler 16 directly from the acid application chamber.

The foregoing process of this invention may be carried out in two separate cabinets—that is, one cabinet for hot water pasteurization and one cabinet for organic acid application. Alternatively, the process may be carried out in a single cabinet with the hot water pasteurization chamber closely adjacent to the acid application chamber. In the latter such arrangement, isolation of the carcass within both hot water pasteurization chamber and acid application chamber may be accomplished by an air curtain across the entrance of the hot water pasteurization chamber, by an air curtain across the exit of the acid application chamber, and by an exhaust system to evacuate water and acid vapors from both chamber interiors. Isolation may still be achieved by maintaining a level of recirculation water within the bottom of the pasteurization chamber by a liquid level controller to provide a liquid seal and by providing a liquid seal drain in the bottom of the acid application chamber.

The microbiological effectiveness of the process has been confirmed in both laboratory and production facilities. In laboratory tests, our antimicrobial treatment virtually eliminated total plate counts for inoculations up to log 5 and tested pathogens were consistently less than the detectable level. Moreover, the incidence of pathogens outside of the inoculated area approached zero.

For production tests, reduction in total plate counts of log 2 (99%) were consistently observed and counts for individual pathogens were reduced to less than log 1.

Reference is next made to the schematic diagram of FIG. 3 for a general understanding of the equipment components for the hot water pasteurization cabinet, air doors, exhaust system and water recirculation system. Greater details of the hot water pasteurization cabinet, air doors ductwork, exhaust ductwork are shown in FIGS. 5–7.

First with respect to FIG. 5, it will be understood by those skilled in the art that a gambrel rail support assembly 31 typically runs throughout the slaughter facilities for transporting animal carcasses from one process stage to the next. Such assembly characteristically includes an I-beam 31a on which are attached a plurality of hanger supports 31b which carry a continuous rail 31c. A movable carriage 31d having a wheel 31e which rollably engages the continuous rail 31c from above includes a hanger hook 31f which extends below the continuous rail 31c to receive an animal carcass 32.

The hot water pasteurization cabinet 33 itself is a generally boxlike housing having side walls 34 & 35; a roof 36 with a longitudinal slot 37 therein to receive the traveling carriage 31d of the gambrel rail assembly 31 which carries the animal carcass 32; and end walls 38 & 39 with entrance and exit openings 40 & 41 respectively therein and sized to accommodate the suspended carcass 32. A liquid collection basin 42 forms the bottom of the hot water pasteurization cabinet 33.

Arranged vertically along the entrance opening 40 in the end wall 38 are air door conduits 43 & 44 with discharge ports directed across the entrance opening 40. Likewise, arranged vertically along the exit opening 41 in the end wall 39 are air door conduits 45 & 46 with discharge ports directed across the exit opening 41. The air door conduits 43–46 are connected by plenum ducts 47 to an air door blower 48. In operation, the air door blower 48 delivers a high volume of air through the plenum ducts 47 to the air door conduits 43–46 to establish an air curtain across both the entrance and exit openings 40 & 41 to substantially isolate the interior of the hot water pasteurization cabinet 33.

The hot water pasteurization cabinet 33 is also equipped with an exhaust piping network 50 accessing the interior of the cabinet and connected to an exhaust blower 51. In operation, the exhaust blower 51 evacuates water vapor from the interior of the hot water pasteurization cabinet 33.

Arranged interiorly of the hot water pasteurization cabinet 33 along opposite side walls 34 & 35 thereof are spray nozzle assemblies 52 & 53 for applying recirculation water over the entire surface of the carcass 32 as previously indicated when the carcass 32 is suspendingly positioned from the overhead gambrel rail support assembly 31 between the opposed spray nozzle assemblies 52 & 53.

Connected to a pipe 54 from the collection basin 42 is a recirculation pump 55. The basin 42 is also fitted with an overflow control 56 to maintain a liquid level in the bottom of the hot water pasteurization cabinet 33 above the intake of the pipe 54 for the pump 55. The recirculation pump 55 is connected by piping 57 to a filter 58 for removing any entrained particulate matter in the recirculation water. The filter 58 is connected to a storage vessel 60 which is also fitted with piping 61 to receive fresh makeup water. An overflow drain 59 is provided in the vessel 60. A spray pump 62 is connected by piping 63 to receive recirculation water from the storage tank 60, pump it through an in-line heater 65 for regulating the water temperature, and then through the pipe network 66 supplying the spray nozzle assemblies 52 & 53 in the hot water pasteurization cabinet 33.

Figure 4:
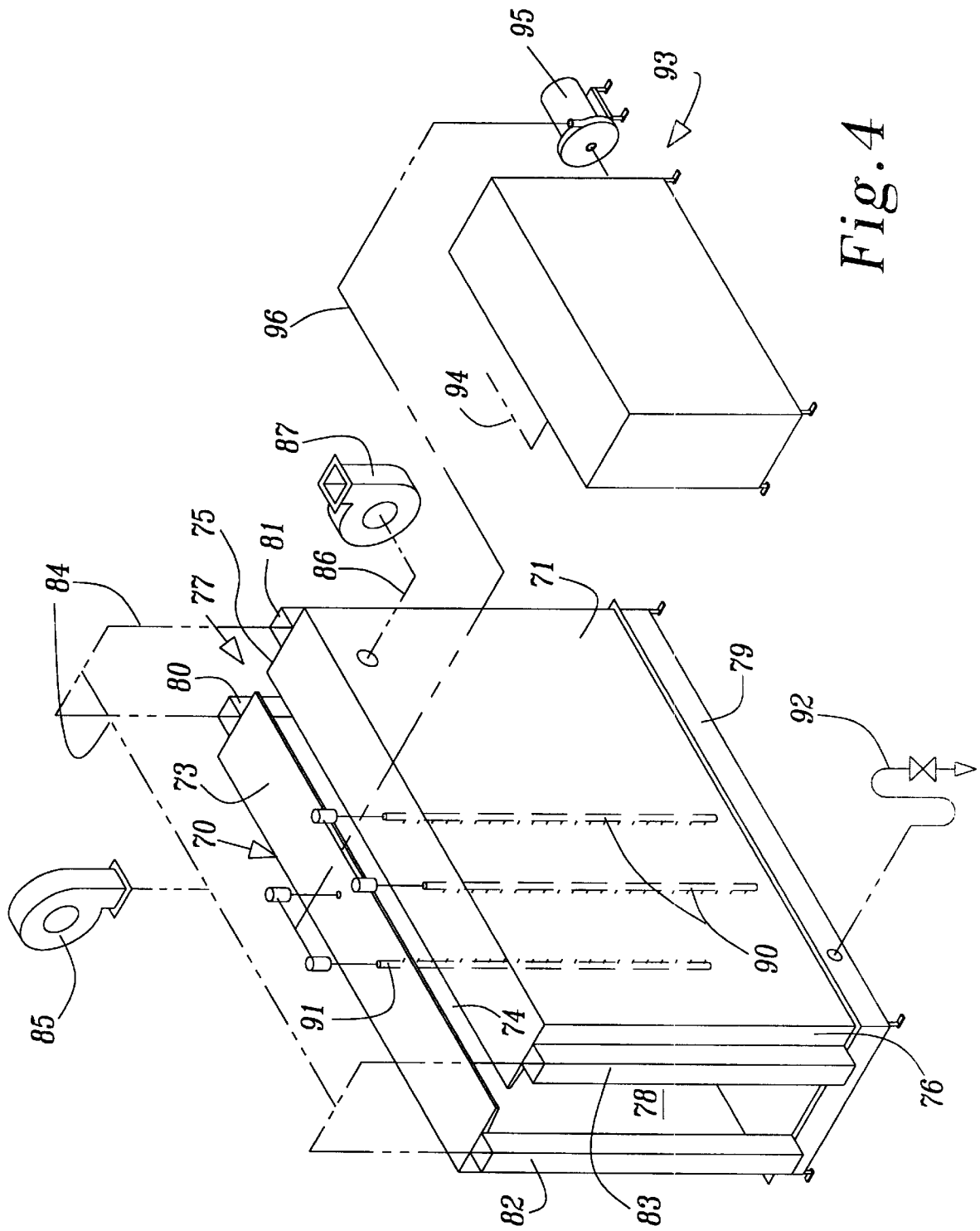
FIG. 4 is a diagram illustrating the equipment arrangement and flow schematic for an organic acid application cabinet used to practice the invention.

Reference is next made to the schematic diagram of FIG. 4 for a general understanding of the equipment components for the acid application cabinet, air doors, exhaust system and acid spray system. Greater details of the acid application cabinet, air doors ductwork, exhaust ductwork are shown in FIGS. 8 & 9.

It will be understood that the gambrel rail support assembly 31 previously described runs continuously overhead from the hot water pasteurization cabinet 33 to the acid application cabinet and then to the chill storage unit of the commercial slaughter facilities.

The acid application cabinet 70 itself is a generally boxlike housing having side walls 71 & 72; a roof 73 with a longitudinal slot 74 therein to receive the traveling carriage 31d of the gambrel rail assembly 31 which carries the animal carcass 32; and end walls 75 & 76 with entrance and exit openings 77 & 78 respectively therein and sized to accommodate the suspended carcass 32. A liquid collection basin 79 forms the bottom of the acid application cabinet 70.

Arranged vertically along the entrance opening 77 in the end wall 75 are air door conduits 80 & 81 with discharge ports directed across the entrance opening 77. Likewise, arranged vertically along the exit opening 78 in the end wall 76 are air door conduits 82 & 83 with discharge ports directed across the exit opening 78. The air door conduits 80–83 are connected by plenum ducts 84 to an air door blower 85. In operation, the air door blower 85 delivers a high volume of air through the plenum ducts 84 to the air door conduits 80–83 to establish an air curtain across both the entrance and exit openings 77 & 78 to substantially isolate the interior of the acid application cabinet 70.

The acid application cabinet 70 is also equipped with an exhaust piping network 86 accessing the interior of the cabinet 70 and connected to an exhaust blower 87. In operation, the exhaust blower 87 evacuates water and acid vapors from the interior of the acid application cabinet 70.

Arranged interiorly of the acid application cabinet 70 along opposite side walls 71 & 72 thereof are spray nozzle assemblies 90 & 91 for applying an organic acid solution over the entire surface of the carcass 32 as previously indicated when the carcass 32 is suspendingly positioned from the overhead gambrel rail support assembly 31 between the opposed spray nozzle assemblies 90 & 91.

Connected to the collection basin 79 in the bottom of the acid application cabinet 70 is a liquid seal drain 92 to aid in isolation of the interior of the acid application cabinet 70.

An acid storage vessel 93 is fitted with necessary supply lines 94 for makeup of the acid solution to be applied. A spray pump 95 is connected to the storage tank 93 to receive heated organic acid solution from the tank 93 and pump it through a pipe network 96 for supplying the spray nozzle assemblies 90 & 91 in the acid application cabinet 33.

In the foregoing description two separate cabinets are disclosed—that is, one cabinet for hot water pasteurization and one cabinet for organic acid application. Alternatively, the two cabinets may be combined in a single cabinet with the hot water pasteurization chamber closely adjacent to the acid application chamber. In the latter such arrangement, isolation of the carcass 32 within both hot water pasteurization chamber and acid application chamber may be accomplished by an air curtain across the entrance of the hot water pasteurization chamber, by an air curtain across the exit of the acid application chamber, and by an exhaust system to evacuate water and acid vapors from both chamber interiors. Isolation may still be achieved by maintaining a level of recirculation water within the bottom of the pasteurization and acid chambers by a liquid level controller.

From the foregoing it will be seen that this invention is one well adapted to attain all end and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A method of antimicrobial treatment of animal carcasses subsequent to the final carcass wash and prior to chill storage in a commercial slaughter operation, the steps of said method comprising:

delivering a carcass from the final carcass wash in a commercial slaughter operation to a hot water pasteurization chamber;

isolating said carcass within said pasteurization chamber;

spraying recirculation water over the entire surface of said carcass isolated within said pasteurization chamber at a minimum temperature of at least 165° F. (74° C.) for a minimum residence time sufficient to kill bacteria;

collecting, in the bottom of said pasteurization chamber, recirculation water sprayed on said carcass isolated within said pasteurization chamber;

maintaining a level of recirculation water within the bottom of said pasteurization chamber to provide a liquid seal; and delivering a portion of said collected recirculation water from below said liquid seal level to a filter;

filtering said collected recirculation water delivered to said filter to remove any entrained particulate matter;

combining said filtered recirculation water with fresh makeup water in sufficient quantity to provide said recirculation water in said spraying step;

heating said recirculation water to a temperature sufficient to permit said water to be applied to said carcass at a minimum temperature of at least 165° F. (74° C.) in said spraying step;

delivering said carcass from said pasteurization chamber to an acid application chamber;

isolating said carcass within said acid application chamber;

spraying organic acid solution over the entire surface of said carcass isolated within said acid application chamber; and delivering said carcass from said acid application chamber to chill storage.

2. The method as in claim 1 wherein said pasteurization chamber includes an entrance and an exit and said step of isolating said carcass within said pasteurization chamber includes providing high pressure air curtains across said entrance and exit of said pasteurization chamber and exhausting water vapor from said pasteurization chamber.

3. The method as in claim 1, said step of spraying recirculation water over the entire surface of said carcass isolated within said pasteurization chamber at a minimum temperature of at least 165° F. (74° C.) being carried out for at least 5 seconds.

4. The method as in claim 1 wherein said acid application chamber includes an entrance and an exit and said step of isolating said carcass within said acid application chamber includes providing high pressure air curtains across said entrance and exit of said acid application chamber.

5. The method as in claim 1 wherein said step of isolating said carcass within said acid application chamber includes exhausting water and acid vapors from said acid application chamber.

6. The method as in claim 1, wherein said organic acid of said organic acid spraying step is selected from the group consisting of acetic acid, lactic acid, citric acid, acidified sodium chloride and mixtures thereof.

7. The method as in claim 6, wherein said organic acid of said organic acid spraying step is in a concentration within the range of 1.5% to 2.5% by volume.

8. The method as in claim 1 wherein said pasteurization chamber includes an entrance and an exit, said acid application chamber includes an entrance and an exit, and said steps of isolating said carcass within said pasteurization chamber and said acid application chamber includes providing high pressure air curtains across said entrance of said pasteurization chamber and across said exit of said acid application chamber, and exhausting water and acid vapors from said pasteurization and acid application chambers.

9. A method of antimicrobial treatment of animal carcasses subsequent to the final carcass wash and prior to chill storage in a commercial slaughter operation, the steps of said method comprising:

delivering a carcass from the final carcass wash in a commercial slaughter operation to a hot water pasteurization chamber having an entrance and an exit;

isolating said carcass within said pasteurization chamber by providing high pressure air curtains across said entrance and exit of said pasteurization chamber;

spraying recirculation water over the entire surface of said carcass isolated within said pasteurization chamber at a minimum temperature of at least 165° F. (74° C.) for a minimum residence time sufficient to kill bacteria;

exhausting water vapor from said pasteurization chamber;

delivering said carcass from said pasteurization chamber to an acid application chamber;

isolating said carcass within said acid application chamber;

spraying organic acid solution over the entire surface of said carcass isolated within said acid application chamber; and delivering said carcass from said acid application chamber to chill storage.

10. A method of antimicrobial treatment of animal carcasses subsequent to the final carcass wash and prior to chill storage in a commercial slaughter operation, the steps of said method comprising:

delivering a carcass from the final carcass wash in a commercial slaughter operation to a hot water pasteurization chamber;

isolating said carcass within said pasteurization chamber;

spraying recirculation water over the entire surface of said carcass isolated within said pasteurization chamber at a minimum temperature of at least 165° F. (74° C.) for a minimum residence time sufficient to kill bacteria;

delivering said carcass from said pasteurization chamber to an acid application chamber having an entrance and an exit;

isolating said carcass within said acid application chamber by providing high pressure air curtains across said entrance and exit of said acid application chamber;

spraying organic acid solution over the entire surface of said carcass isolated within said acid application chamber; and delivering said carcass from said acid application chamber to chill storage.

11. Apparatus for antimicrobial treatment of animal carcasses movably suspended on a gambrel rail support assembly subsequent to the final carcass wash unit and prior to the chill storage unit of a commercial slaughter facility, said apparatus comprising:

a hot water pasteurization cabinet having an entrance opening for the ingress of an animal carcass on said gambrel rail support assembly received from said final carcass wash unit and having an exit opening for the egress of said animal carcass;

first and second air curtains associated respectively with said entrance and exit openings to isolate said carcass within said hot water pasteurization cabinet;

a plurality of water spray nozzles positioned and arranged within said hot water pasteurization cabinet for spraying recirculation water over the entire surface of said carcass isolated within said pasteurization cabinet at a minimum temperature of at least 165° F. (74° C.) for a minimum residence time sufficient to kill bacteria;

an acid application cabinet adjacent said hot water pasteurization cabinet, said acid application cabinet having an entrance opening for the ingress of an animal carcass on said gambrel rail support assembly received from said hot water pasteurization cabinet and having an exit opening for the egress of said animal carcass;

third and fourth air curtains associated respectively with said acid application cabinet entrance and exit openings to isolate said carcass within said acid application cabinet;

a plurality of acid spray nozzles positioned and arranged within said acid application cabinet for spraying organic acid solution over the entire surface of said carcass isolated within said acid application cabinet prior to deliver of said carcass to said chill storage unit.

12. The apparatus as in claim 11 further including:

a collection basin in the bottom of said pasteurization cabinet for collecting recirculation water sprayed on said carcass isolated within said pasteurization cabinet;

a recirculation pump connected to said collection basin to pump recirculation water therefrom;

a filter connected to said recirculation pump to remove any entrained particulate matter from said recirculation water;

a storage tank for receiving filtered recirculation water from said filter and for receiving fresh makeup water in sufficient quantity to provide said recirculation water to said pasteurization cabinet; and a heater to heat said recirculation water to a temperature sufficient to permit said water to be applied to said carcass at a minimum temperature of at least 165° F. (74° C.).

13. The apparatus as in claim 12 further including a liquid level controller to maintain a preselected level of recirculation water within said collection basin in order to provide a liquid seal in the bottom of said pasteurization cabinet for isolation of said carcass received therein.

14. The apparatus as in claim 11 further including an exhaust blower connected to said pasteurization cabinet for evacuating water vapor therefrom.

15. The apparatus as in claim 11, said plurality of water spray nozzles being positioned and arranged within said hot water pasteurization cabinet for spraying recirculation water over the entire surface of said carcass isolated within said pasteurization cabinet at a minimum temperature of at least 165° F. (74° C.) for a minimum residence time of 5 seconds.

16. The apparatus as in claim 11 further including an exhaust blower connected to said acid application cabinet for evacuating water and acid vapors therefrom.

17. The apparatus as in claim 11 wherein said organic acid is selected from the group consisting of acetic acid, lactic acid, and mixtures thereof.

18. The apparatus as in claim 17 wherein said organic acid is in a concentration within the range of 1.5% to 2.5% by volume.

19. Apparatus for antimicrobial treatment of animal carcasses movably suspended on a gambrel rail support assembly subsequent to the final carcass wash unit and prior to the chill storage unit of a commercial slaughter facility, said apparatus comprising:

a treatment cabinet having an entrance opening for the ingress of an animal carcass on said gambrel rail support assembly received from said final carcass wash unit and having an exit opening for the egress of said animal carcass, said treatment cabinet having a hot water pasteurization chamber therein adjacent said entrance opening and having an acid application chamber therein adjacent said exit opening;

first and second air curtains associated respectively with said entrance and exit openings to isolate said carcass within said treatment cabinet;

a plurality of water spray nozzles positioned and arranged within said hot water pasteurization chamber for spraying recirculation water over the entire surface of said carcass isolated within said treatment cabinet at a minimum temperature of at least 165° F. (74° C.) for a minimum residence time sufficient to kill bacteria; and a plurality of acid spray nozzles positioned and arranged within said acid application chamber for spraying organic acid solution over the entire surface of said carcass isolated within said treatment cabinet prior to deliver of said carcass to said chill storage unit.

20. The apparatus as in claim 19 further including:

a collection basin in the bottom of said pasteurization chamber for collecting recirculation water sprayed on said carcass isolated within said treatment cabinet;

a recirculation pump connected to said collection basin to pump recirculation water therefrom;

a filter connected to said recirculation pump to remove any entrained particulate matter from said recirculation water;

a storage tank for receiving filtered recirculation water from said filter and for receiving fresh makeup water in sufficient quantity to provide said recirculation water to said pasteurization chamber;

a heater to heat said recirculation water to a temperature sufficient to permit said water to be applied to said carcass at a minimum temperature of at least 165° F. (74° C.); and an exhaust blower connected to said treatment cabinet for evacuating water and acid vapors therefrom.

21. A method of antimicrobial treatment of animal carcasses subsequent to the final carcass wash and prior to chill storage in a commercial slaughter operation, the steps of said method comprising:

delivering a carcass from the final carcass wash in a commercial slaughter operation to a hot water pasteurization chamber having an entrance and an exit;

isolating said carcass within said pasteurization chamber by providing high pressure air curtains across said entrance and exit of said pasteurization chamber;

spraying recirculation water over the entire surface of said carcass isolated within said pasteurization chamber at a minimum temperature of at least 165° F. (74° C.) for a minimum residence time sufficient to kill bacteria;

exhausting water vapor from said pasteurization chamber;

delivering said carcass from said pasteurization chamber to an acid application chamber having an entrance and an exit;

isolating said carcass within said acid application chamber by providing high pressure air curtains across said entrance and exit of said acid application chamber;

spraying organic acid solution over the entire surface of said carcass isolated within said acid application chamber;

exhausting water and acid vapors from said acid application chamber; and delivering said carcass from said acid application chamber to chill storage.

* * * * *